June 17, 1952     C. E. BANNISTER     2,600,607
LOAD-SUSTAINING AND FLUID-CONDUCTING HOSE
Filed Nov. 18, 1947     3 Sheets-Sheet 1
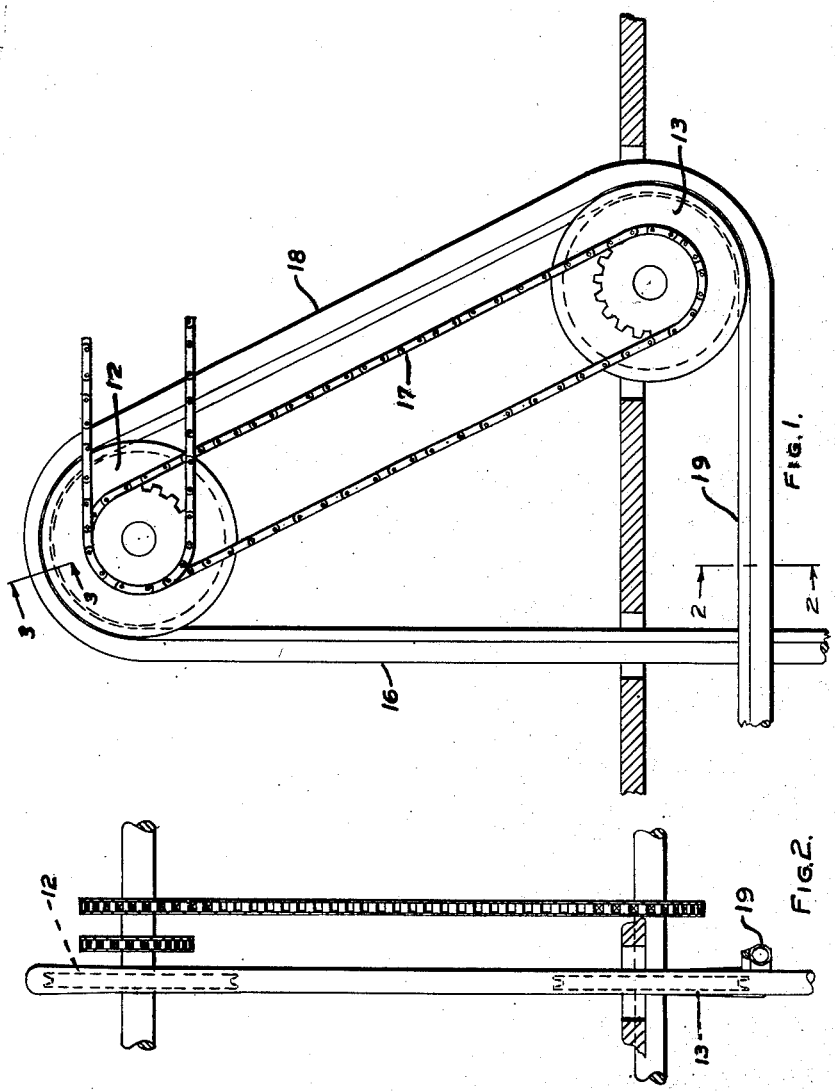
CLYDE E. BANNISTER
INVENTOR.

June 17, 1952   C. E. BANNISTER   2,600,607
LOAD-SUSTAINING AND FLUID-CONDUCTING HOSE
Filed Nov. 18, 1947   3 Sheets-Sheet 2

CLYDE E. BANNISTER
INVENTOR.
BY
Willard D. Eakin
ATTORNEY.

INVENTOR.
CLYDE E. BANNISTER
BY Willard D. Eakin
ATTORNEY

Patented June 17, 1952

2,600,607

UNITED STATES PATENT OFFICE 2,600,607

LOAD-SUSTAINING AND FLUID-CONDUCTING HOSE

Clyde E. Bannister, Houston, Tex.

Application November 18, 1947, Serial No. 786,763

7 Claims. (Cl. 254—135)

This invention relates to fluid-conducting and load-sustaining hose suitable for use in lowering and raising, and supplying motive fluid to, a fluid-actuated motor and associated mechanism, as in the drilling of an oil well, for example, by the use of mechanism such as is described and claimed in my U. S. Reissue Patent No. 19,397, granted December 18, 1934 (original 1,965,563, granted July 10, 1934) and my U. S. Patent No. 2,254,641, granted September 2, 1941.

Its chief objects are to provide a hose that can serve such purposes without the aid of supporting means separate from the hose structure and to avoid the necessity of clamping the hose at spaced positions to a supporting cable as it passes into service from a reel, and unclamping it as it is returned to the reel.

Further objects are to provide a hose having high tensile strength and yet having such flexibility as to be run over pulleys of moderate size, and to provide a hose having means for effective non-slip engagement with a pulley or pulleys over which it is run.

Of the accompanying drawings:

Fig. 1 is an elevation of a hose embodying my invention in its preferred form and a pulley assembly for letting it into and pulling it out of a well.

Fig. 2 is an elevation of the same from the left of Fig. 1, the hose being shown as being sectioned on line 2—2 of Fig. 1.

Figure 3:
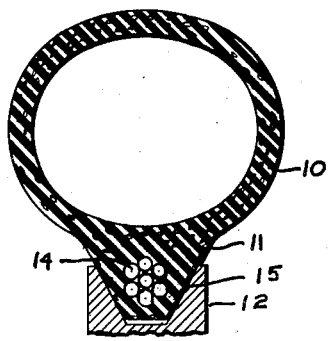
Fig. 3 is a fragmentary section on line 3—3 of Fig. 1.

The hose shown in Figs. 1 to 3 comprises a cord-reinforced rubber hose body 10 having integral with or locally adhered to it a tension-sustaining and driving rib 11 which fits in the grooves of grooved pulleys 12 and 13 and functions in the manner of a side-driving or V-type belt.

For high tensile strength in conjunction with flexibility the rib 11 can have within it a suitable core such, for example, as the cable core 14 here shown, and can have a bias fabric or cord cover 15 as shown.

Because of the wedging and snubbing effect of the V shape of the rib in its complementally formed groove in the pulley 12, next to the vertical tension reach 16 of the hose, the said tension reach will support a heavy load without slipping of the hose on the pulley 12, as the hose is let into the well, especially when the running of the hose onto the pulley is controlled, even with only a moderate tensioning effect, as by means of the pulley 13, held to the same speed as that of the pulley 12 by means of a sprocket chain 17.

Likewise in the pulling of the hose out of the well the V-belt grip of the rib 11 in the groove of the pulley 12 is greatly enhanced by even a moderate tensioning of the intervening reach 18 of the hose, maintained by the grip of the equal-speed pulley 13.

Consequently the hose does not have to be run over a large number of pulleys to prevent slippage, although the invention is not limited to the use of only two pulleys as here shown.

Figure 7:
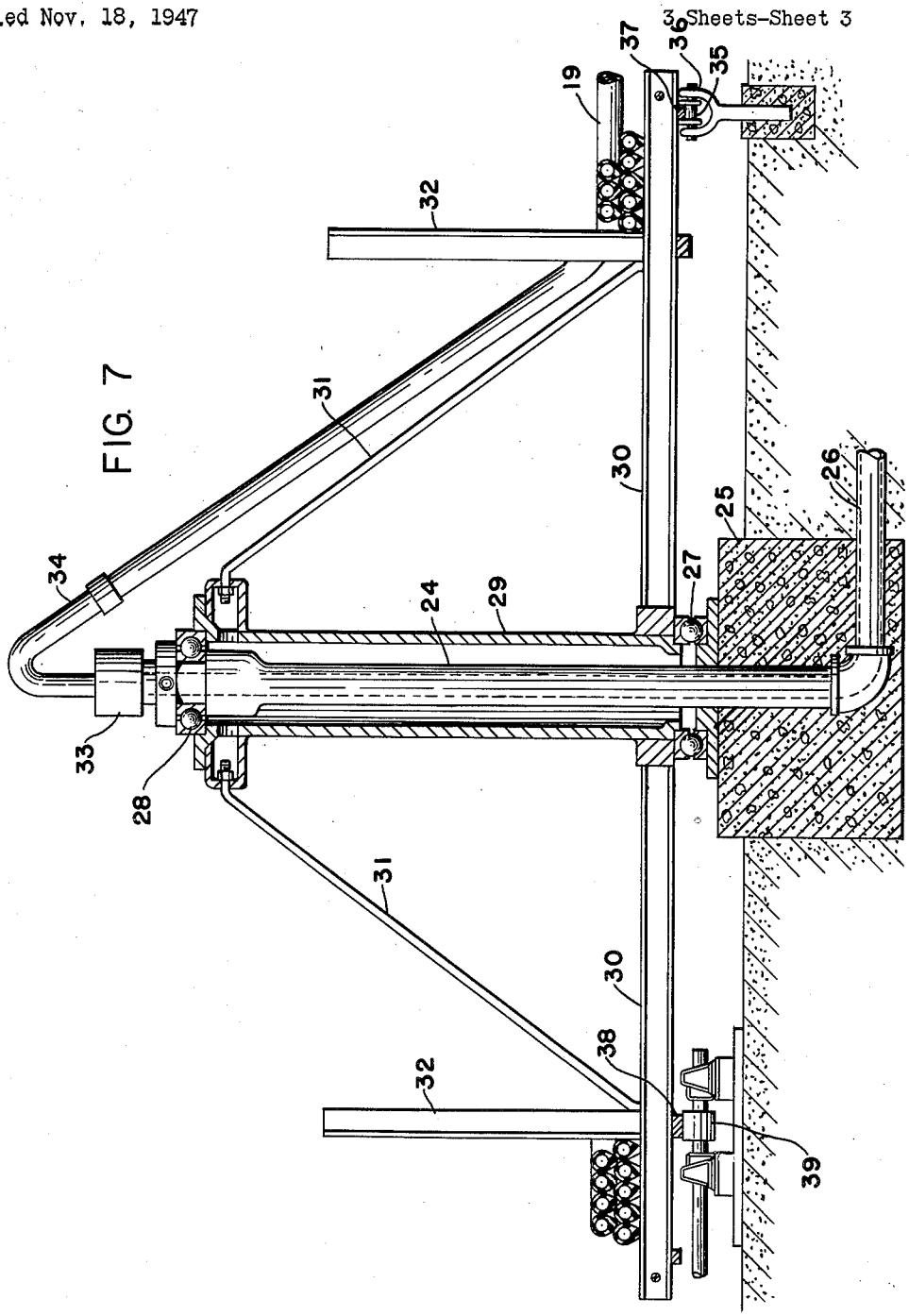
Fig. 7 is a vertical middle section of a storage or supply reel assembly adapted to have hose pass from it to the pulley assembly shown in Fig. 1.

Whether the hose is being run into the well or out of the well, under load, still less tension is required to be maintained on the reach 19 of hose between the pulley 13 and the hose storage means, such as the slip-drive reel shown in Fig. 7. This makes it feasible to have the path of that reach of the hose such that it runs onto and off of the pulley 13 a little out of alignment with the pulley's groove, so that it passes the vertical reach 16 at a substantial distance from it, as shown clearly in Fig. 2, where the hose is shown as being sectioned on line 2—2 of Fig. 1.

In spite of such slight misalignment the rib 11 of the hose will seat squarely in the groove throughout nearly all of its arc of contact, and the angle of the misalignment does not need to be very large when, as here shown, the pulley 13 is at a considerable distance from the vertical reach 16 of the hose.

The construction as shown and described is such that the wall of the hose is required to withstand only the transverse bursting strain imposed by the contained pressure fluid, and consequently the hose does not have to be so stiff as to strongly resist its being bent about a pulley, and it can be of such structure that it will flatten somewhat, as shown, in running over the pulleys, with corresponding decrease of longitudinal stretch of its portion farthest from the pulley.

Also the reinforcing elements can be disposed at such a low pitch in the hose, less than that of balanced-construction hose (about 52½° from a lengthwise line on the hose), that at the same time, by reason of their low pitch, they effectively resist bursting strains and also permits the part of the hose wall diametrically opposite the rib 11 to have high longitudinal stretchability for the bending of the hose about the pulleys.

Figure 4:
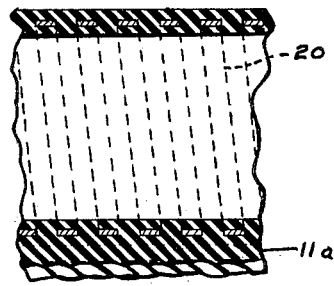
Fig. 4 is a fragmentary middle, longitudinal section of an alternative hose structure.

For example, Fig. 4 shows a hose having a single-wind, square-wire reinforcement 20 wound at a very low pitch such that it is almost in line with the bursting strains and presents almost no resistance of its own to longitudinal stretch of the hose wall.

Also the construction as shown and described is such that the rib structure, 11ª of Fig. 4, can be secured to the body of the hose by simply cementing it, because each foot of adhesion, lengthwise of the hose, is required to support only a foot of the hose, the aggregate weight of the hose being sustained by the cable or like reinforcement in the V-shaped rib.

Figure 5:
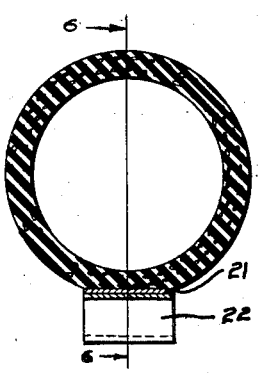
Fig. 5 is a cross-section of another modification, on line 5—5 of Fig. 6.
Figure 6:
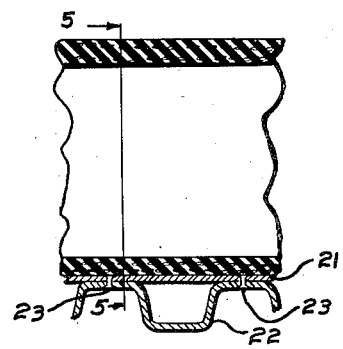
Fig. 6 is a fragmentary, longitudinal, middle section of the same on line 6—6 of Fig. 5.

Figs. 5 and 6 show a modification in which the hose has secured to one side of it a flexible "rack" structure adapted to coact with a suitable pinion or pinions (not shown) for letting the hose into and pulling it out of the well.

Preferably, as shown, the rack structure comprises a flat strip of flexible sheet metal 21 secured to the outer face of the hose as by vulcanized adhesion and a zig-zag, tooth-providing strip 22 secured to the strip 21 at spaced positions as by rivets 23, 23. Each U-shaped tooth portion of the strip 22 can be deformed slightly by bending of the structure as a whole, with slight relative creepage of the contacting faces of the two strips except at the rivets, in consequence of which the ensemble can have sufficient flexibility for coacting with a pinion of moderate size.

The hose reel assembly shown in Fig. 7, as the preferred means for supplying hose to the pulley assembly shown in Fig. 1, comprises a vertical fluid-conducting and reel-centering and supporting pipe 24 mounted at its lower end in a concrete base 25 and having connection through a pipe 26 with a suitable source of pressure fluid.

The reel, journaled upon the vertical pipe 24 by means of radial-and-thrust bearings 27, 28, comprises a larger pipe 29 surrounding the pipe 24 and constituting the hub of the reel; a circumferentially spaced set of radial beams 30, 30 welded to the hub and constituting a supporting means for the hose; a set of brace rods 31, 31 connecting the upper end of the hub with the respective beams; and a set of vertical posts 32, 32 secured to the respective beams 30 and constituting a winding-form for the hose.

At its top the supply pipe 24 is connected by a swivel coupling 33 and a goose-neck 34 with the first-wound convolution of the hose, so that pressure fluid can be continuously conducted through the coil of hose on the reel while the reel is rotated.

Although the reel can be rotatably supported wholly by the radial-and-thrust bearings 27, 28, additional supporting and/or steadying means can be provided as by a set of idler rollers, of which one is shown at 35, mounted in suitable bearing forks such as the one shown at 36, and supportingly contacting the under face of a circular rail 37 secured to the under side of the reel.

Because of the different diameters of convolutions of hose on the reel, it is desirable that the reel be a slip-drive reel, as above stated. As one example of slip-drive means for the reel it is shown as having a circular drive rail 38 secured to its lower side and bearing against a friction roller 39 provided with means (not shown) for exerting upon the reel such driving force as to rotate the reel only when augmented by tension in the off-running, horizontal reach 19 of the hose.

The invention is of course not limited to any particular means for effecting appropriate variation of the speed of rotation of the reel.

Other modifications are possible without departure from the scope of the invention as defined in the appended claims.

I claim:

1. In combination with means for letting off hose into a well hole and comprising a hold-back wheel having non-slip means on its periphery and let-off means for feeding the hose to said wheel, a hose operatively associated therewith and comprising a through-passage fluid-conducting hose body and, anchored to and projecting from one side of the hose body, tension-sustaining means comprising non-slip means for coacting with the non-slip means on the wheel.

2. A combination as defined in claim 1 in which V-groove walls are the non-slip means on the wheel and in which the non-slip means on the hose is shaped for wedging coaction with the walls of the groove.

3. A combination as defined in claim 1 in which V-groove walls are the non-slip means on the wheel and in which the non-slip means on the hose is shaped for wedging coaction with the walls of the groove, and in which the let-off means comprises a plurality of V-groove wheels journaled in suitable relationship for the hose to be trained about them in a loop of at least 360 degrees.

4. A combination as defined in claim 1 in which the non-slip means on the wheel and the non-slip means on the hose are shaped for positive interlock against lengthwise slippage of the hose on the wheel.

5. A fluid-conducting, load-sustaining hose comprising a fluid-conducting through-passage hose body and, anchored to and projecting outwardly from the external wall of the hose body, an axially extending rib suitably tapered outward from the hose body for wedging coaction with the groove walls of a V-groove pulley for frictional sustension of longitudinal tension in the said hose body.

6. A fluid-conducting, load-sustaining hose comprising a fluid-conducting through-passage hose body and, anchored to and projecting outwardly from the external wall of the hose body, an axially extending rib suitably tapered outward from the hose body for non-slip frictional coaction with the groove walls of a V-groove pulley for frictional sustension of longitudinal tension in the said hose body, and a load-sustaining cable imbedded in said rib.

7. A fluid-conducting, load-sustaining hose comprising a through-passage, fluid-conducting hose body and, anchored to and projecting outwardly from the external wall of the hose body, axially extending flexible, tension-sustaining means for sustaining longitudinal tension in the said hose body and non-slip means on said flexible means and shaped for positive non-slip interlock with interlock non-slip means on a wheel.

CLYDE E. BANNISTER.

(References on following page)

REFERENCES CITED

The following references are of record in the file of this patent:

UNITED STATES PATENTS

| Number | Name | Date |
|---|---|---|
| 169,760 | Baker | Nov. 9, 1875 |
| 493,650 | Ryder | Mar. 21, 1893 |
| 1,245,274 | Riley | Nov. 6, 1917 |
| 1,394,300 | Gammeter | Oct. 18, 1921 |
| 1,568,594 | Flint | Jan. 5, 1926 |
| 2,144,478 | Baumgratz | Jan. 17, 1939 |
| 2,173,340 | Myers | Sept. 19, 1939 |
| 2,173,359 | Freedlander | Sept. 19, 1939 |
| 2,212,169 | Rendle | Aug. 20, 1940 |
| 2,268,321 | Flynn | Dec. 30, 1941 |
| 2,274,168 | Scharpenberg | Feb. 24, 1942 |
| 2,277,786 | Schulthress | Mar. 31, 1942 |
| 2,384,462 | Goodman | Sept. 11, 1945 |
| 2,423,579 | Buren | July 8, 1947 |
| 2,444,583 | Stewart et al. | July 6, 1948 |

FOREIGN PATENTS

| Number | Country | Date |
|---|---|---|
| 924,364 | France | Mar. 3, 1947 |